United States Patent [19]

Cobb, Jr.

[11] Patent Number: 5,040,883

[45] Date of Patent: Aug. 20, 1991

[54] LIGHT FIXTURE WITH BEAM SHAPING LENS

[75] Inventor: Sanford Cobb, Jr., St. Mary's Point, Minn.

[73] Assignee: Minnesota Mining and Manufacturing Company, Saint Paul, Minn.

[21] Appl. No.: 429,163

[22] Filed: Oct. 30, 1989

[51] Int. Cl.⁵ .......................... G02B 3/08; G02B 5/04
[52] U.S. Cl. .................................... 350/452; 350/286
[58] Field of Search ............. 350/452, 276 SL, 96.13, 350/167, 286, 431, 96.28; 362/331, 33

[56] References Cited

U.S. PATENT DOCUMENTS 4,385,808  5/1983  Vanderwerf .................. 350/452

FOREIGN PATENT DOCUMENTS 0054902  4/1982  Japan ........................... 350/452

Primary Examiner—Paul M. Dzierzynski
Assistant Examiner—Rebecca D. Gass
Attorney, Agent, or Firm—Gary L. Griswold; Walter N. Kirn; Stephen W. Buckingham

[57] ABSTRACT

A light extraction film has light extraction structures on one surface and a Fresnel lens for beam shaping on the opposite surface.

11 Claims, 1 Drawing Sheet

LIGHT FIXTURE WITH BEAM SHAPING LENS

In many situations a light fixture having specialized light output characteristics is desired. For example, a back-lit display might require a line source having collimated output. Such a light fixture could then be used for edge lighting the display. In other situations a sign could be illuminated from the front by a light source along one edge. In such a situation it is desirable to direct more light to the distant edge of the sign than the near edge so that the illumination of the sign will be more uniform. In situations requiring such specialized light distribution reflectors of complex shape are often placed behind the lighting element to produce a light beam having the desired characteristics. Such reflectors are commonly bulky, increasing the size of the lighting element, and are often quite expensive.

SUMMARY OF THE INVENTION

In the present invention a light extraction film has first and second major surfaces. The first major has linear light extraction structures formed thereon. The light extraction structures serve to extract light from a beam of light and direct it toward the second major surface. The second major surface has a Fresnel lens for producing a shaped output light beam formed thereon.

DETAILED DESCRIPTION OF A PREFERRED EMBODIMENT

In the present invention a light fixture utilizes a film having light extractor structures on one surface and a Fresnel lens for beam shaping on the opposite surface to intercept a quasi-collimated beam of light. It should be noted that two varieties of light beams are contemplated. One is a direct collimated beam emanating from a small source and a parabolic reflector. The second is a confined beam, wherein light is confined to travel for some distance in a light guide. Such light guides are taught in U.S. Pat. No. 4,260,220 and U.S. Pat. No. 4,805,984. A light guide manufactured according to the teaching of those has an outer wall. The exterior of the outer wall has a plurality of linear right-angled prisms thereon. Light traveling along the light guide and entering the outer wall will strike the prisms and undergo total internal reflection, thus being directed back to the interior of the guide. The present invention is useful to extract light from either a direct or a confined beam.

Figure 1:
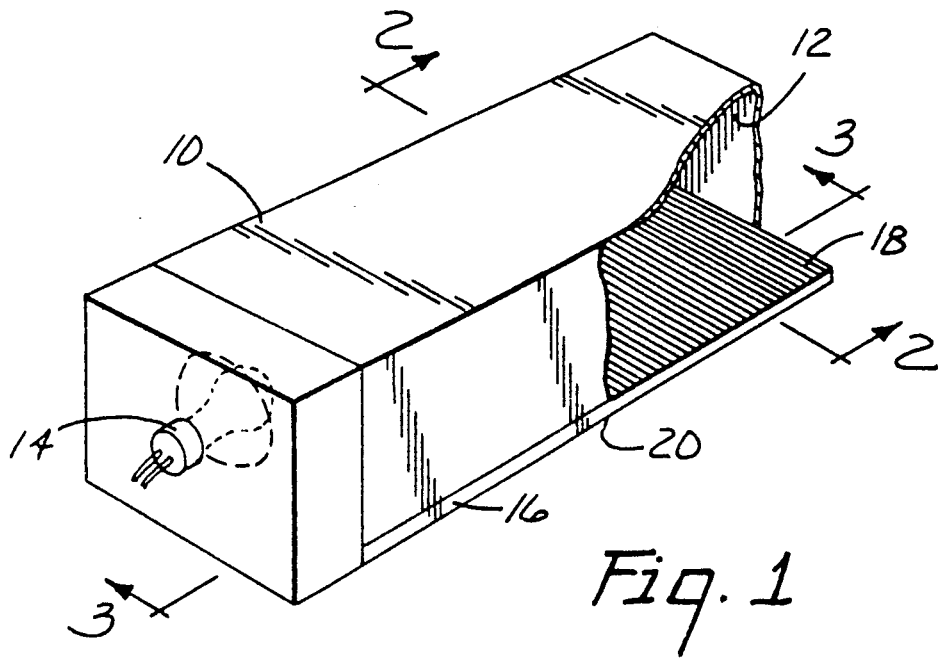
FIG. 1 is a view of a light fixture utilizing a light extraction film according to the invention.

FIG. 1 illustrates a light fixture according to the invention. In the light fixture of FIG. 1 a housing 10 defines an optical cavity 12. Inside optical cavity 12 is a light source 14. As shown, light source 14 has a parabolic mirror for collimation. Alternatively, housing 10 could be of a light guide material so that a confined beam rather than a collimated beam would be used. Housing 10 has an optical window on one side. Lying in the optical window is film 16. Film 16 has a first major surface 18 and a second major surface 20. Major surface 18 has prisms that act as light extractors while major surface 20 has a Fresnel lens for shaping the output light. Film 16 is of a transparent material and preferably of a transparent polymeric material. Particularly preferred materials are polycarbonates and acrylies.

Figure 2:
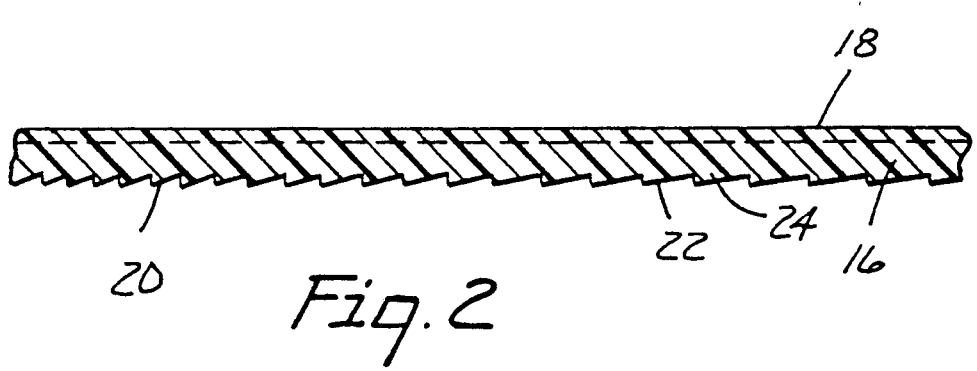
FIG. 2 is a first cross sectional view of a light extraction film according to the invention.

FIG. 2 shows a cross section of film 16 along section lines 2 of FIG. 1. As may be seen there are a plurality of structures such as structure 22 and structure 24 on surface 20. These structures are the elements of a linear Fresnel lens. Although linear Fresnel lenses are generally prefered, particular application of the invention may require Fresnel lenses having elements that are circular or other shapes. Each element has an axis that runs parallel to the direction of the light beam. The nature of the Fresnel lens formed by the structures on surface 20 will depend upon the desired light output. If the light fixture is to be used as a source for edge lighting for example, the structures upon FIG. 20 would typically mimic the behavior of a conventional convex cylindrical lens, thus focusing the light into a line. Alternatively, if another pattern is desired, other, often more exotic, styles of lenses may be mimicked. The lens design suggested should correspond to the desired light output characteristics.

Figure 3:
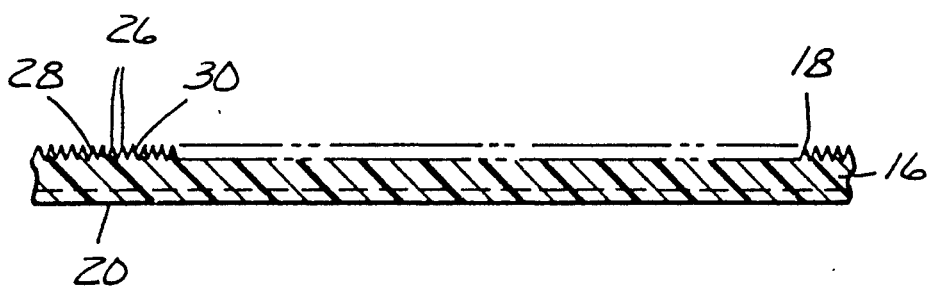
FIG. 3 is a second cross sectional view of a light extraction film according to the invention.

FIG. 3 is a cross section of film 16 along section lines 3 of FIG. 1. As shown in FIG. 3, side 18 of film 16 has a plurality of triangular prisms lying thereon. As shown, the prisms are isosceles triangles, but that is not required. The use of isosceles prisms is preferred, however, because they will work equally well with light from either direction. Therefore the light fixture may be illuminated at both ends to provide both more light and greater uniformity. The operation of the prisms as light extractors may be understood with reference to prism 26. Prism 26 has two sides 28 and 30. In operation, light enters prism 26 through one of the two sides, for example, side 28, and crosses the prism striking side 30. At 30 the light undergoes total internal reflection and is reflected through film 16 and out through surface 20 where, in combination with the light traveling through the remainder of the film, it forms the desired shaped beam.

It has been found that prisms having included angles in the range of 59 to 79 degrees are preferred, with a particularly preferred value of 69 degrees for reasonably broad quasi-collimated light source and an acrylic extractor film.

Figure 4:
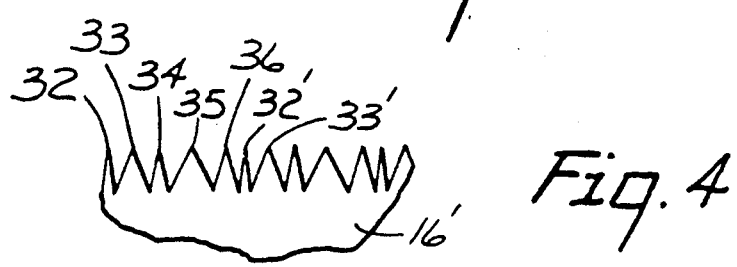
FIG. 4 is a cross sectional view of an alternative embodiment of a film according to the invention.

As previously explained, the nature of the output beam will be shaped by the Fresnel lens on surface 20. If the Fresnel lens has this linear elements shaping, however, only affects the distribution of the light in the direction perpendicular to the original beam. In the direction parallel to the beam the distribution can be controlled by the extraction structures on surface 18. If, as shown in FIG. 3, the structures are all triangles having the same included angle, the light will emerge collimated in the direction parallel to the original light beam. As shown in FIG. 4, film 16' has a plurality of isosceles triangles having varying included angles provided thereon. Typically these will be in a repeating series. As may be seen in FIG. 4, prisms 32, 33, 34, 35 and 36 each have different included angles. The sequence then begins again with prism 32' and 33' having equal included angles to prisms 32 and 33 respectively. The number of prisms in the sequence to be repeated is not fixed, but will be determined by the requirements of a particular design. For example, in one extraction film manufactured for a test a series of seven prisms was utilized. These prisms had included angles of 78.5 degrees, 63.5 degrees, 71.0 degrees, 76.0 degrees, 66.0 degrees, 73.5 degrees, and 68.5 degrees. After one group of such prisms, the pattern repeats. The advantage of varying the prism angles in this manner is light is spread out over a wider range of angles in the direction parallel to the original beam rather than collimated, as occurs when a single included angle is used.

I claim:

1. Light extraction film for producing a shaped output light beam having first and second major surfaces said first major surface having linear light extraction structures thereon, each of said light extraction structures having an axis running in a first direction, said light extraction structures being for extracting light from a beam of light and directing said extracted light toward said second major surface, and a Fresnel lens formed on said second major surface for shaping said output light beam.

2. The light extraction film of claim 1 wherein said Fresnel Lens comprises a plurality of linear structures, each of said linear structures having an axis running in a second direction.

3. The light extraction film of claim 2 wherein said first direction is perpendicular to said second direction.

4. The light extraction film of claim 1 wherein said light extraction structures comprise a plurality of triangular prisms.

5. The light extraction film of claim 4 wherein said triangular prisms form isosceles triangles.

6. The light extraction film of claim 5 wherein said prisms have included angles in the range of 59° to 79°.

7. The light extraction film of claim 6 wherein said Fresnel Lens comprises a plurality of linear structures, each of said linear structures having an axis running in a second direction.

8. The light extraction film of claim 7 wherein said first direction is perpendicular to said second direction.

9. The light extraction film of claim 5 wherein said prisms are divided into repeating groups wherein said prisms of a group have varying included angles.

10. The light extraction film of claim 9 wherein said Fresnel Lens comprises a plurality of linear structures, each of said linear structures having an axis running in a second direction.

11. The light extraction film of claim 10 wherein said first direction is perpendicular to said second direction.

* * * * *